United States Patent [19]

Vila-Masot et al.

[11] Patent Number: 5,015,919
[45] Date of Patent: May 14, 1991

[54] EMERGENCY LIGHTING SYSTEM PROVIDED WITH A FLUORESCENT TUBE

[75] Inventors: Oscar Vila-Masot, Puerto La Cruz, Venezuela; Janis Melis, Budapest, Hungary

[73] Assignee: LED Corporation N.V., Netherlands Antilles

[21] Appl. No.: 382,177

[22] Filed: Jul. 19, 1989

[51] Int. Cl.⁵ .................. H05B 37/04; H05B 41/14
[52] U.S. Cl. ........................... 315/86; 315/87; 315/127; 315/171; 315/200 R; 320/2
[58] Field of Search ............ 315/87, 86, DIG. 5, 315/DIG. 4; 307/64, 65, 66

[56] References Cited

U.S. PATENT DOCUMENTS

| | | | |
|---|---|---|---|
| 3,348,060 | 10/1967 | Jamieson | 307/66 |
| 3,599,070 | 8/1971 | Davis | 315/86 |
| 3,659,179 | 4/1972 | Barker et al. | 315/87 |
| 3,660,714 | 5/1972 | Chandler | 315/86 |
| 4,232,252 | 10/1980 | Peil | 315/87 |
| 4,388,563 | 6/1983 | Hyltin | 315/DIG. 4 |
| 4,583,004 | 4/1986 | Yearsin | 307/66 |
| 4,728,808 | 3/1988 | Bet-Esh et al. | 307/66 |
| 4,920,299 | 4/1990 | Presz et al. | 315/DIG. 5 |

FOREIGN PATENT DOCUMENTS

| | | | |
|---|---|---|---|
| 0004673 | 1/1977 | Japan | 315/86 |
| 0003983 | 9/1989 | Japan | 315/86 |

Primary Examiner—Eugene R. LaRoche
Assistant Examiner—Son Dinh
Attorney, Agent, or Firm—Hoffman, Wasson & Gitler

[57] ABSTRACT

An emergency lighting system provided with a U-shaped fluorescent tube having power supplied by a square wave oscillator connected to a relatively small sized battery. A battery charger is employed to charge the battery when the standard AC source is connected to the network. An electronic switching circuit is included which will switch the oscillator on when a network failure is sensed and will switch if off when the network appears to be operating properly. The switching circuit also ensure that the battery does not discharge below a particular voltage level.

5 Claims, 2 Drawing Sheets

EMERGENCY LIGHTING SYSTEM PROVIDED WITH A FLUORESCENT TUBE

BACKGROUND OF THE INVENTION

1. Field of the Invention

Emergency lighting systems are commonly used in buildings or other structures to provide a source of illumination when the main power circuitry is disrupted, therby disabling any illumination devices attached to that circuit. Virtually any building to which public access is permitted is equipped with numerous emergency lighting systems to provide a source of at least limited illumination when conventional line circuit network becomes non-functional, and therefore the standard illumination devices are inoperable.

2. Prior Art

Prior art emergency lighting systems are generally equipped with storage batteries which produce energy for incandescent lamps of 10 watts or more for a given period of time. The requirement for these emergency lighting systems, as well as the amount and duration of this illumination is mandated by various ordinances and rules. It is well-known by one possessing ordinary skill in art that incandescent lamps have a relatively low light consumption characteristic which neccessitates a relatively large size battery and therefore a high-powered battery charger. As a consequence, the entire prior art emergency lighting systems have a relatively short life period with the typical low voltage incandescent lamp employed therewith. Therefore, the prior art system requires constant monitoring to ensure that the incandescent lamps utilized therewith, as well as the emergency lighting system are still functioning.

SUMMARY OF THE INVENTION the present invention overcomes the deficiencies of the prior art by providing an emergency lighting system including a U-shaped, compact fluorescent tube having power supplied thereto by a high frequency, square wave electronic oscillator. A relatively small size battery and battery charger are included to power the oscillator, and thereby illuminate the fluorescent tube when the conventional circuitry of a building is disrupted, and the fluorescent tube is used to illuminate a particular enviroment. The entire system is connected to the conventional line circuit and the current supplied from this circuit is used to charge the battery. An elecronic switching circuit is included which would initiate the operation of the oscillator when the conventional circuitry fails. The switching circuit would also switch off the oscillator as the conventional circuitry is put back on line, and would additionally switch off the oscillator when the battery is discharged to a predetermined low threshold level.

The present invention employs a relatively new, compact, U-shaped fluorescent tube which is smaller in size than most fluorescent tubes. This particular U-shaped tube is approximately three times brighter than typical low voltage incandescent lamps having the same power consumption. Furthermore, the life of the U-shaped fluorescent tube is extremely long when compared to low voltage incandescent lamps used in standard emergency lighting systems. Since the efficiency of an emergency lighting system utilizing a U-shaped fluorescent tube is at least three times greater than that of a standard incandescent lamp, a much smaller battery is needed, thereby decreasing the size and weight as well as the expense of manufacturing an emergency lighting system employing this type of fluorescent tube technology.

The above and other objects, features and advantages of the present invention will become more apparent from the following description thereof taken in conjunction with the accompanying drawing.

DETAILED DESCRIPTION OF THE PREFERRED EMBODIMENT

Figure 1:
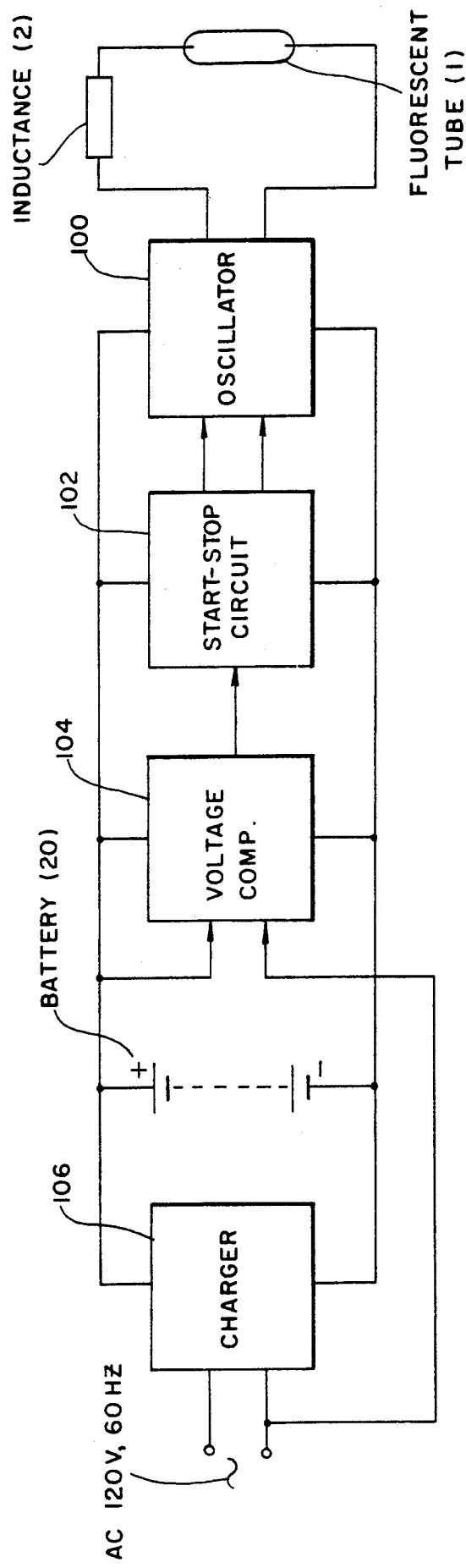
FIG. 1 is a functional block diagram of the circuit of the present invention.

As illustrated with respect to the block diagram of FIG. 1, the emergency lighting system of the present invention includes a rather compact U-shaped fluorescent tube 1, used to produce illumination during an emergency situation, as well as an inductance 2 placed in series with the tube 1. The fluorescent tube is supplied power from a battery 20 through a square wave oscillator 100 producing a high frequency symmetrical AC voltage.

When the conventional circuitry of the building is operating properly, the battery 20 will be charged by a battery charger 106. A voltage comparator circuit 104 is included for monitoring the voltage level of the battery 20 during both the charging operation, as well as subsequent to this charging operation. Additionally, this circuit 104 monitors the conventional AC voltage source to determine whether the emergency lighting system should be enabled due to a failure in the conventional circuit, or in the AC voltage source. If a failure is noted, a start-stop circuit 102 is used to initiate as well as to discontinue the operation of the oscillator circuit 100.

Figure 2:
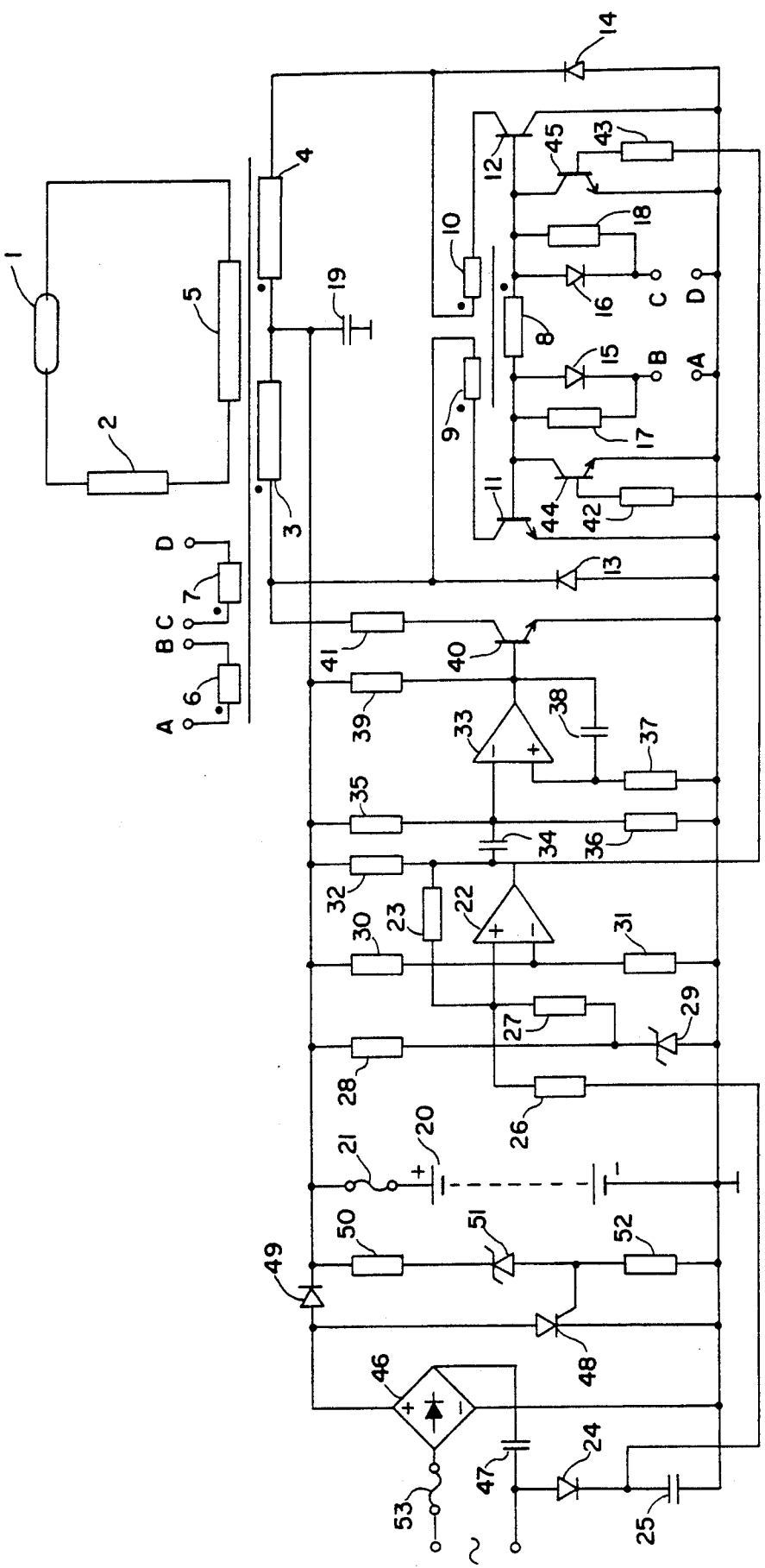
FIG. 2 is a schematic diagram of the circuit of the present invention.

FIG. 2 details the specific circuitry utilized in the emergency lighting system in which the square wave oscillator includes a push-pull transformer including windings 3, 4, 5, 6 and 7 as well as transistors 11 and 12. As additionally shown in the drawing, winding 6 is connected to resistor 17 and diode 15 provided in parallel with one another. Furthermore, winding 7 is connected to a parallel configuration including a resistor 18 and a diode 16. Diodes 13 and 14 are used to shunt transistors 11 and 12 respectively for conducting currents when these transistors are not conducting. A capacitor 19 is employed to shunt the high frequency conponents of the oscillator. The transistors 11 and 12 operate in the switch mode controlled by a saturated current transformer including windings 8, 9 and 10. The winding 5 produces a high frequency symmetrical square wave voltage for the series connected fluorescent tube 1 and inductance 2. The frequency of the oscillator is approximately 30 kHz, dependent upon the voltage level of the battery 20.

The voltage comparator circuit 104 includes a voltage comparator integrated circuit (IC) 22 having an open collector provided with resistors 23, 32 and 27 to produce a non-inverting voltage comparator with hysteresis. The voltage connected to the inverting input of the IC 22 is determined by the series connected resistors 30 and 31 in such a manner so as to produce an input voltage of one-half of the battery voltage $V_B$. A reference voltage $V_{REF} = 5.6$ V is produced by a Zener diode 29 and a current limiting resistor 28. The reference voltage is connected by the resistor 27 to the non-inverting input of IC 22. When the AC voltage source is operating properly, a capacitor 25 would be charged through diode 24 to a DC voltage determined by the peak value of the AC voltage source. Voltage is produced across resistor 27 by resistor 26 and the DC voltage of capacitor 25 which is added to the reference voltage. the sum of these voltages is larger than one-half of the voltage of battery 20 and will cause a high level to be produced at the output of IC 22. As will be subsequently explained, this high level output would cause the oscillator 100 to be turned off. When the AC voltage source is disrupted, the voltage appearing at resistor 27 will disappear and the half voltage of the battery will be larger than the voltage of the non-inverting input, thereby resulting in a low level at the output of IC 22, thereby actuating the oscillator 100. However, when the voltage of the battery decreases to below a permissible value, the output of the IC 22 will also be at a high level, thereby switching off the oscillator 100.

The start-stop circuit 102 is connected to the voltage comparator circuit 104, and based upon the level of the IC 22, the circuit 102 will either initiate or cease the operation of the oscillator 100. Resistors 42 and 43 are both connected to the output of the voltage comparator circuit and to the bases of transistors 44 and 45 respectively. The collectors of these transistors 44 and 45 are connected to the bases of transistors 11 and 12. When the output of voltage comparator circuit is at high level, the transistors 44 and 45 will be conducting. Consequently, the bases of transistors 11 and 12 will be short circuited by the transistors 44 and 45 and the oscillator 100 will not operate, nor will voltage be applied to the fluorescent tube, However, when the output of the voltage comparator circuit is at a low level, the transistors 44 and 45 will not conduct and no short circuit would be applied to the bases of transistors 11 and 12. Furthermore, a negative edge triggering monostable multivibrator consisting of a voltage comparator IC 33, capacitors 34, 38 and resistors 35, 36, 37 and 39 would provide a positive output pulse. Therefore, a transistor 40 connected to the output of IC 33 will be conducting during the production of a pulse for approximately one millisecond and a current will flow through resistor 41 and across the winding 3. Interruption of the current flowing across the winding 3 will induce voltage in the push-pull transformer. The oscillator would then begin to produce a square wave voltage and the fluorescent tube will be illuminated.

The emergency lighting system is powered by a storage battery 20, which in turn is charged by a battery charger 106 when the charging circuit is connected to the AC voltage source. This AC voltage source is connected to rectifier bridge 46 for converting the alternating current to direct current to be applied to the battery 20. A capacitor 47 and a fuse 53 are used to connect the alternating current course to the rectifier bridge 46. The output of rectifier bridge 46 is connected to the battery 20 through fuse 21. Since the voltage of the battery 20 is much lower than the amplitude of the alternating current source, current flowing into the battery 20 through the rectifier bridge 46 can be determined by the capacitor 47 itself which is basically independent of the voltage of the battery 20 in a given range, as for example, a 12 volt nominal voltage battery. A thyristor 48 is connected in parallel with the rectifier bridge 46 and is controlled by Zener diode 51 and series resistors 50 and 52. The voltage of the Zener diode 51 is determined by the maximum permissible charging voltage of the battery 20. When the voltage on the output rectifier bridge 46 reaches the conducting voltage of the Zener diode 51, a current will flow across the Zener diode 51 and resistors 50 and 52 and the thyristor 48 will be triggered. Consequently, the rectifier bridge 46 will be shorted by the thyristor 48 during the remaining time of the half period of the network voltage. At the end of this half period, thyristor 48 will cease to conduct and the process will repeat itself. When thyristor 48 does not conduct, the current flowing form the alternating current source will be used to charge the battery 20. Since capacitor 47 is a reactive device, any losses are inconsequential when compared to the charging power of battery 20. A diode 49 is included to ensure that the battery 20 would not be short circuited when the thyristor 48 is conducting.

Various modifications can be made to this particular circuit which would be contemplated by one possessing ordinary skill in the art. For example, the present invention describes a U-shaped fluorescent tube having power between 3 and 11 watts, supplied to a square wave electronic oscillator having a frequency higher than 20 kHz. The particular values were found to be particularly efficacious, but are not construed to be so limited.

What is claimed is:

1. An emergency lighting system connected to a source of conventional line current comprising:
    a fluorescent tube;
    an inductance connected in series with said fluorescent tube;
    an oscillator circuit connected to said fluorescent tube providing a square wave signal, said oscillating including:
        a push-pull transformer comprising first and second primary windings and a secondary winding connected to said inductance and said fluorescent tube;
        a first transistor switch connected to said first primary winding;
        a second transistor switch connected to said second primary winding; and
        a saturated transformer connected to said second primary winding;
    a storage battery having a positive and negative pole, said battery connected to said oscillator circuit;
    a charging circuit connected between the source of conventional line current and said storage batter; and
    sensing means connected to the line current source for initiating power to said oscillator circuit when the line current is discontinued.

2. The emergency lighting system in accordance with claim 1 wherein said fluorescent tube is compact and U-shaped.

3. The emergency light system in accordance with claim 1, wherein said sensing means includes:
    a voltage comparator integrated circuit provided with a non-inverting and an inverting input;
    a diode and capacitor connected in series with the negative pole of said storage battery;
    a reference voltage source consisting of a first resistor connected to a Zener diode;
    a second resistor connected to the non-inverting input and the output of said voltage comparator integrated circuit;

a third resistor connected to the common point of said diode and said capacitor and also connected to the non-inverting input of said voltage comparator integrated circuit;

a fourth resisstor connected to said reference voltage source and to the non-inverting input of said voltage comparator integrated circuit; and fifth and sixth series connected resistors connected to the positive poles of said storage battery and the common point of said fifth and sixth resistors connected to the inverting input of said voltage comparator integrated circuit.

4. The emergency lighting system in accordance with claim 3 wherein said sensing means further includes:

a monostable multivibrator connected to the output of said voltage comparator integrated circuit;

a third transistor, the base of which is connected to said monostable multivibrator and the emitter of which is connected to the negative pole of said storage battery;

a seventh resistor connected to the collector of said third transistor and said first primary winding;

a fourth transistor, the collector of which is connected to the base of said first transistor switch, the emitter of said fourth transistor connected to the negative pole of said storage battery;

an eighth resistor connected to the base of said fourth resistor and to the output of said voltage comparator integrated circuit;

a fifth transistor, the collector of which is connected to the base of said second transistor switch, the emitter of said fifth transistor connected to the negative pole of said storage battery; and a ninth resistor connected to the base of said fifth transistor and to the output of said voltage compacitor integrated circuit;

5. The emergency lighting system in accordance with claim 1, wherein said charging circuit includes:

a rectifier bridge connected between the source of conventional current and said storage battery;

a capacitor connected between said rectifier bridge and the source of conventional current;

a diode connected between said rectifier bridge and the positive pole of said storage battery;

a thyristor connected across the positive and negative outputs of said rectifier bridge; and a Zener diode and first and second resistors connected in series across said storage battery, the common point of said Zener diode and said second resistor being connected to the gate of said thyristor.

* * * * *